United States Patent [19]

Sparks et al.

[11] Patent Number: 5,447,390
[45] Date of Patent: Sep. 5, 1995

[54] PROCESS FOR MANUFACTURING A VARIABLE STIFFNESS LINE AND ASSOCIATED ELEMENT

[75] Inventors: Charles Sparks, Le Vesinet; Pierre Odru, Fontenay Sous Bois; Marcel Auberon, Le Haillan; Guy Metivaud, Talence, all of France

[73] Assignees: Institut Francais du Petrole, Rueil Malmaison; Aerospatiale, Cedex, both of France

[21] Appl. No.: 980,796
[22] PCT Filed: Jun. 24, 1992
[86] PCT No.: PCT/FR92/00577
 § 371 Date: Apr. 12, 1993
 § 102(e) Date: Apr. 12, 1993
[87] PCT Pub. No.: WO93/00441
 PCT Pub. Date: Jan. 21, 1993

[30] Foreign Application Priority Data

Jul. 1, 1991 [FR] France ................................ 91 08210
Nov. 12, 1991 [FR] France ............................. 91 13912

[51] Int. Cl.⁶ .......................... E02B 17/00; F16L 9/12
[52] U.S. Cl. ........................... 405/195.1; 405/224; 405/202; 166/367
[58] Field of Search .................. 405/195.1, 202, 223.1, 405/224, 224.2, 224.3; 166/350, 359, 367; 464/181, 182, 183

[56] References Cited

U.S. PATENT DOCUMENTS

| | | | |
|---|---|---|---|
| 4,362,521 | 12/1982 | Puck et al. | 464/181 |
| 4,589,801 | 5/1986 | Salama | 405/224 |
| 4,605,385 | 8/1986 | Puck et al. | 464/181 |
| 4,854,781 | 8/1989 | Sparks et al. | 405/224 |

*Primary Examiner*—David H. Corbin
*Attorney, Agent, or Firm*—Antonelli, Terry, Stout & Kraus

[57] ABSTRACT

A process for manufacturing a line of variable stiffness over part of the length thereof and the associated element which allows the line to have the variable stiffness thereof is disclosed. The element is integrated during the manufacturing of the line or deposited thereafter around the line; the element consists of composite material underlayers in which the directions of the fibers have at least one component making a zero or a low-value angle with the axis of the pipe, and the layers end in a graded way. The process has application to the manufacturing of a riser base.

25 Claims, 6 Drawing Sheets

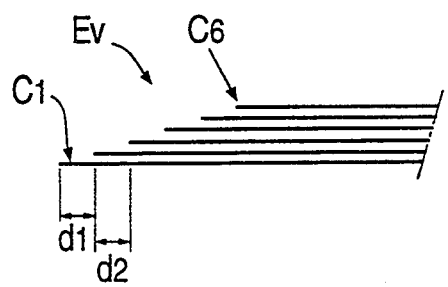
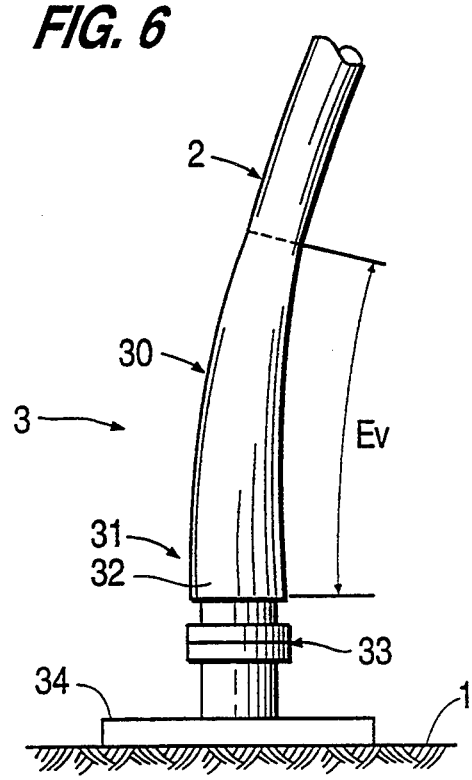
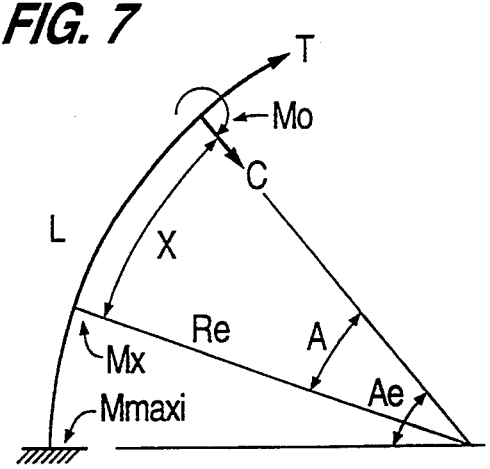

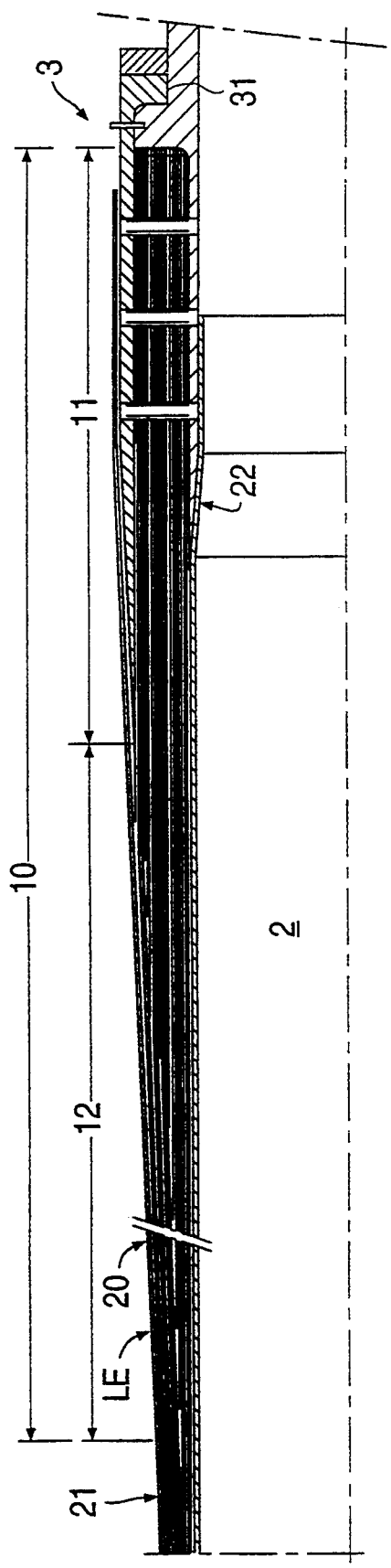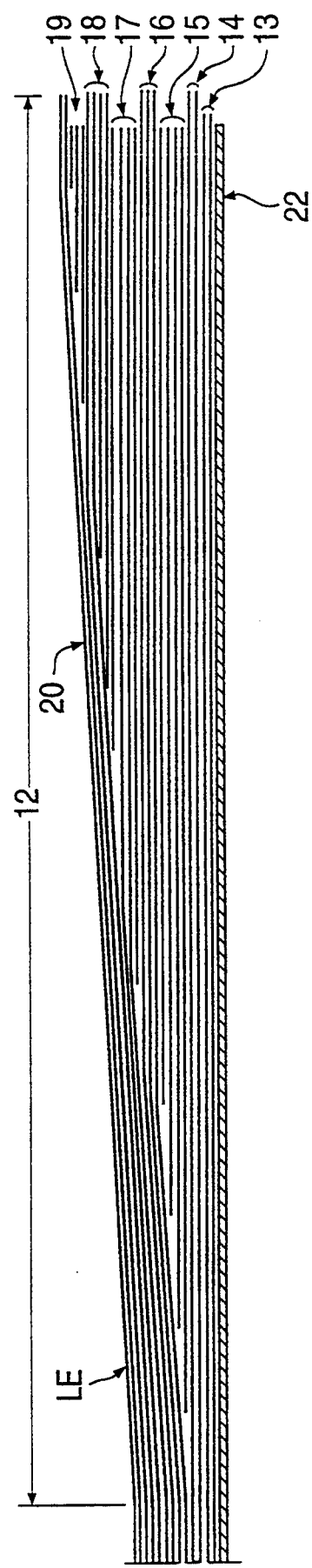

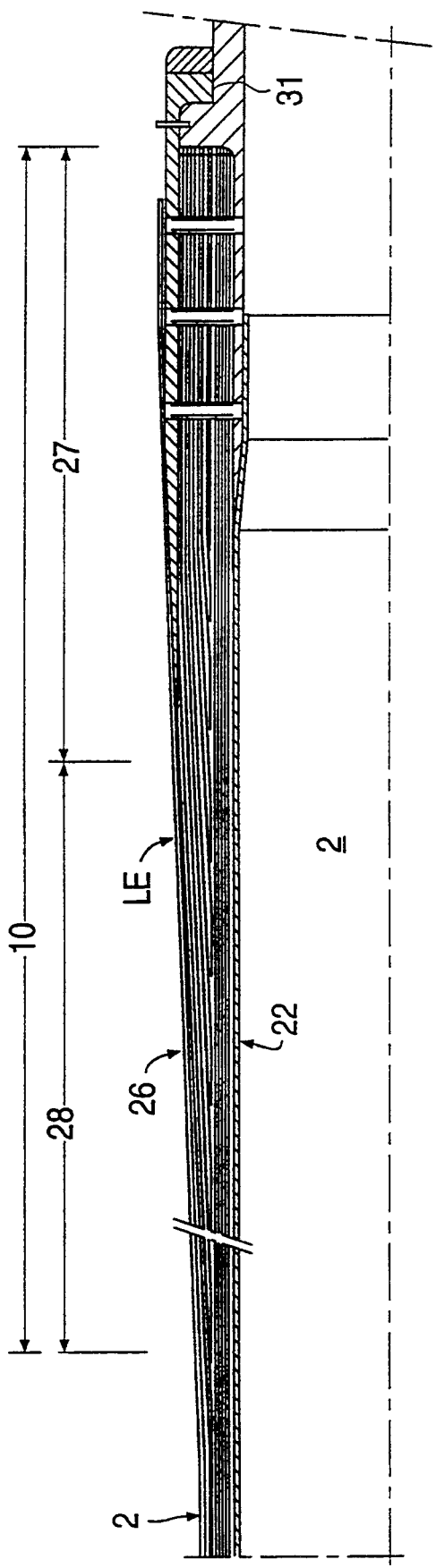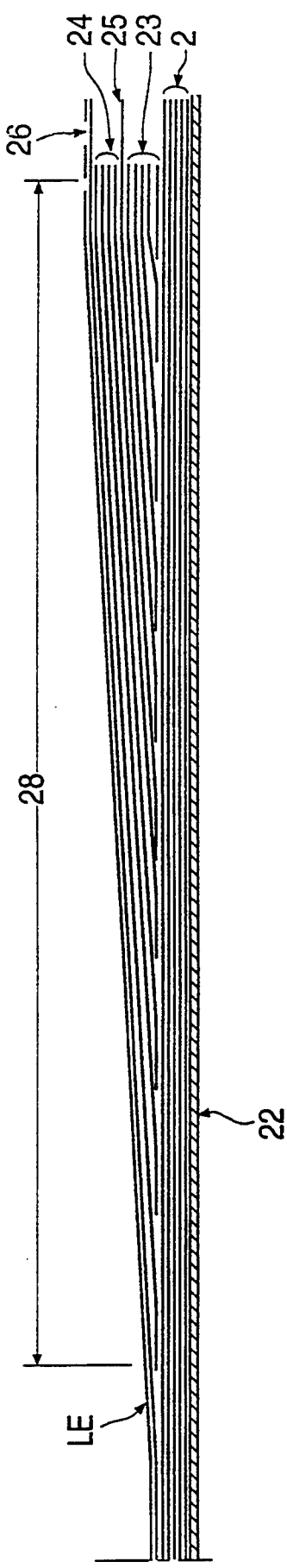
FIG. 4A
FIG. 4B

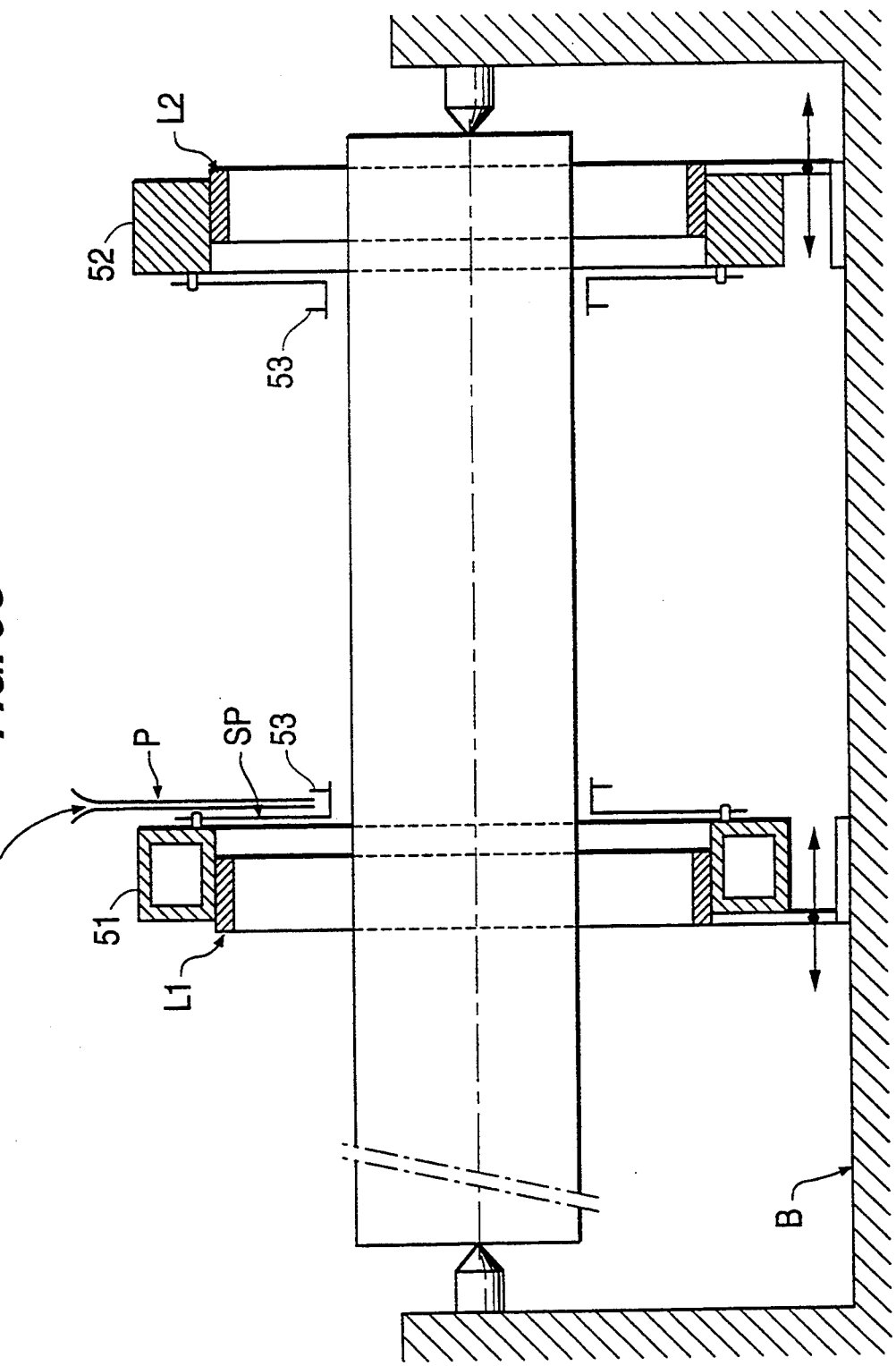

PROCESS FOR MANUFACTURING A VARIABLE STIFFNESS LINE AND ASSOCIATED ELEMENT

FIELD OF THE INVENTION

The present invention relates to a process for manufacturing a line of locally variable stiffness and a variable stiffness element allowing the line to have the variable stiffness.

This invention may notably be applied for the manufacturing of a line connected to a fixed point, with the other end of the line being likely to move, and the fixed point may be located at the bottom of a water body.

The present invention is notably applicable to taut lines, for example, anchoring lines, petroleum production transfer lines, such as risers.

BACKGROUND OF THE INVENTION

Current production and drilling strings are generally connected to the sea bottom through a joint composed of a ball joint or a flex joint allowing an angular movement of the order of 10° in any direction. The exception to this rule is provided by the tension-leg platforms installed on the Hutton field in the North Sea and the Jolliet field in the Gulf of Mexico, where the production strings are directly embedded in the wellheads which are combined on the platform vertical.

Such an embedding is advantageous for several reasons. Firstly, it avoids imposing a significant bending on the tubings which are located inside the string. It further reduces the angular clearances thereof. Finally, it is more compact, less costly, and requires less maintenance than a ball joint.

In the case where a drilling riser is used, such a link considerably reduces the wear of the pipes.

The drawback of embedding is that the moments induced by the lateral offset of the platform, a well as by the effect of the sea current, may be extremely high. In order to reduce the bending stresses, which would otherwise exceed the limit allowable in the string, it becomes necessary to give the string or line a variable stiffness over part of the length thereof, more particularly close to the embedding. This is achieved by means of a variable stiffness element.

The element may be designed so that the curvature caused is substantially constant over the total length thereof. This requires that the stiffness in bending (EI) evolves in a precise way along the element.

The data of the problem are the following:
$A_B$=the angle at the base of the string in the case of a non stiff joint,
$(EI)_R$=the stiffness in bending of the string,
$(EI)_O$=the stiffness in bending of the upper end of the variable stiffness element, and
$M_O$=the maximum allowable moment at the joint between the string and the element
If T=the tensile force on the joint and $C_O$=the shear force on the joint and by putting $$K_R = \sqrt{T/(EI)_R}$$

$$V_R = \sqrt{T \cdot (EI)_R}$$

$R_e$=the minimum allowable bending radius of the element (=$(EI)_O/M_O$) and

L=the length of the element.

To understand these designations better, see FIG.7 of the present application.

It can be demonstrated that the following relations are approximately correct:

$$C_O = K_R \cdot M_O \tag{1}$$

The length (L) necessary for the element $$L = (EI)_O \left[ \frac{A_B}{M_O} - \frac{1}{V_R} \right] \tag{2}$$

The angle ($A_e$) by which the element must bend is $$A_e = \left[ \frac{1}{1 + \frac{(EI)_O}{V_R \cdot L}} \right] A_B \tag{3}$$

The required evolution of the stiffness in bending (EI) along the element $$(EI)_x = (EI)_O [1 + K_R \cdot x] + T \frac{x^2}{2} \tag{4}$$

The maximum moment at the lower end of the element $$M_{max} = M_O [1 + K_R \cdot L] + T \cdot R_e \frac{A_e^2}{2} \tag{5}$$

It can be deduced from Equation (2) that the lower the mimimum stiffness in bending $(EI)_O$ of the element is, the shorter the element may be.

Equation (5) shows that the maximum moment transmitted to the foundation is in direct relationship with the length (L) of the element and with the allowed bending radius ($R_e$). It is therefore desirable to make this element as supple as possible.

In the case where the string is made of a supple material such as, for example, a composite material (carbon fibers/glass fibers/resin) and if the element consists of a stiff material such as steel for example, it is possible that the allowable moment ($M_O$) at the joint between them is much lower in the string than in the element.

There are two possible solutions.

The element may be made longer than it needs to be for itself. The alternative consists in introducing a transition joint several meters long and of constant section between the string and the variable stiffness element.

The optimum solution in order to avoid having to introduce a transition joint between the string and the variable stiffness element is to provide the element with an upper end at least as supple in bending as the string itself.

It is the same way in the case of a string made of a stiff material such as steel for example, and of an element consisting of a supple material such as, for example, a composite material (carbon fibers, glass fibers, resin).

In the description hereafter of the present invention, what is called composite material is a material comprising fibers, such as glass fibers, carbon fibers, aramid fibers, coated in a matrix such as a thermoplastic or a thermosetting matrix, for example an epoxy resin.

What is called draping is the deposition of a set of resin-coated fibers by applying a contact pressure. The fibers may be pre-impregnated with the resin or coated with resin after being deposited.

Draping may be achieved with unidirectional plies made of fibers in a single direction or with fabrics whose fibers generally have two directions forming an angle of 90°.

The standard part of a pipe is defined as generally consisting of several layers made of fibers wound at at least two angles with respect to the axis of an initial pipe.

Various processes are known for manufacturing pipes whose length is practically insensitive to variations in the operating conditions when they are used in the field of hydrocarbon prospecting and development, and more particularly the following three patents.

Patent FR-2,557,254 thus describes a process allowing production of flexible pipes whose length is practically insensitive to the effect of the internal pressure.

Patent FR-2,267,840 describes a process for manufacturing composite pipes whose length practically does not vary under the effect of the internal pressure variations.

Patent FR-2,648,535 allows an optimization of the characteristics of composite pipes such as those described in the above-cited two patents.

But these prior processes do not allow obtaining a pipe or an element whose stiffness varies.

French patent FR-2,616,858 describes an element whose stiffness in bending varies and is close to that of a string made from a composite material. According to this prior art document, the element achieved thereby consists of shells made of metal or possibly of other materials, arranged in one or several layers around the pipe. The dimensions of each shell and the lay-out of the various shell layers are such that the evolution of the stiffness of the pipe and the shell assembly along the element is that which is required by a variable stiffness riser base, while respecting the limit stresses of the different components of the element.

However, the prior elements do not allow a stiffness in bending values substantially equal to those of a string made from a composite material.

French patent application FR-2,641,841 describes a process for the continuous winding of fibers round a spindle allowing to assemble a metallic tip to a pipe, but which does not allow to obtain spooled layers of variable lengths.

SUMMARY OF THE INVENTION

The present invention relates to a process for manufacturing a line having a variable stiffness over at least part of the length thereof, and the element providing this result.

The manufacturing process uses winding techniques such as those described in patents FR-2,557,254, FR-2,627,840 and FR-2,648,535 and draping technique known in the prior art.

The process according to the invention provides a line whose stiffness varies over at least part of the length thereof. According to this invention, at least one variable stiffness element is associated the line, the element consisting of composite underlayers in which the directions of the fibers have at least one component making a zero angle or a low-value angle with the axis of the line, and the underlayers ending in a graded way.

The variable stiffness element may be produced by surrounding the line and by linking it thereto.

The variable stiffness element may be integrated during the process of manufacturing of the line.

The process then comprises the following stages:

a) a first layer of fiber composite is wound in a helicoid way with an angle equal, in absolute value, to alpha with respect to the axis of an initial pipe;

b) a second layer of fiber composite is wound in a helicoid way with an angle equal, in absolute value, to beta with respect to the axis of the pipe;

c) one or several draped composite underlayers are deposited, the underlayers having longitudinal dimensions which grow shorter as the underlayer is located further from the axis of the pipe;

d) one or several layers of the type of the first or of the second layer are wound, and e) the assembly is subjected to a cross-linking stage.

The cross-linking of the assembly may be achieved either through thermal curing, or by any other process using radiations (X rays or electron bombardment), for example, by ionization, the latter process being particularly suitable in view of the considerable thickness of the structure of the variable stiffness zone.

This process multiplies the linkings between the layers providing the variable stiffness and the layers forming the standard part of the line.

The cohesion of one or several underlayers is then provided by the matrix which adheres to the fibers and substantially forms a continuous medium at the time of the cross-linking.

According to another particular feature of the invention, the manufacturing process may comprise the following stages:

a) a first layer of fiber composite is wound in a helicoid way with an angle equal, in absolute value, to alpha with respect to the axis of an initial pipe;

b) a second layer of fiber composite is wound in a helicoid way with an angle equal, in absolute value, to beta with respect to the axis of the pipe;

c) essentially longitudinal fibers are continuously deposited so as to constitute composite underlayers, said underlayers having longitudinal dimensions which grow shorter as said underlayer is located further from the axis of the pipe;

d) one or several layers of the type of the first or of the second layer are wound; and e) the assembly is subjected to a cross-linking stage.

The initial pipe may be an inner liner providing the tightness of the pipe.

Stage e) may be followed by a stage which consists of depositing around the assembly an outer liner providing the tightness of the assembly.

Stage c) may comprise the following stages:

g) a ring is positioned at each end of a length defining an underlayer forming the variable stiffness element, with the ring bearing spikes distributed on the periphery thereof;

h) the fibers or fiber plies forming an underlayer are spooled by turning round on the spikes;

i) each end of the fibers or fiber plies is bound by circumferential winding, so that the protuberances due to the returns on the spikes are located outside the part of constant thickness of the underlayer located between the two rings;

j) the protuberances due to the return on the spikes are removed;

k) at least one of the two rings is displaced by a pitch equal to the offset that is wanted between the underlayers forming the variable stiffness element;

l) stages g) to k) are repeated until a number of underlayers corresponding to the variable stiffness desired for the variable stiffness element is obtained.

According to one embodiment variant, stage c) comprises the following stages:

m) a ring is positioned at each end of a length defining an underlayer bearing the variable stiffness element, said ring having spikes distributed on the periphery thereof;

n) the fibers or fiber plies forming an underlayer are spooled by turning round on the spikes;

o) the assembly is subjected to a cross-linking stage;

p) the protuberances due to the returns on the spikes are removed;

q) at least one of the two rings is displaced by a pitch equal to the offset that is wanted between the underlayers constituting the variable stiffness;

l) stages m) to q) are repeated until a number of underlayers corresponding to the variable stiffness desired for the variable stiffness element is obtained.

During the process, the fibers or fiber plies constituting an underlayer of the variable element may be 2O spooled by means of needles or hooks distributed on the periphery of two rings located at each end of a length corresponding to an underlayer forming the variable stiffness element.

A fiber or ply of longitudinal fibers may turn back around two spikes having a circumferential path between the two spikes which it passes round.

The values of angles aloha and beta are selected so as to ensure the pressure and traction stability of the structure of the line.

Draped underlayers made from composite material such as carbon may be used.

The spooled underlayers made from composite material may be carbon fibers.

Operations c and d are repeated as often as necessary so as to obtain a variable stiffness value for the stated line.

During stage c, underlayers whose longitudinal dimensions are decreased in a constant way as the position of the underlayer is far from the axis of the pipe are deposited.

During stage c, underlayers whose longitudinal dimensions are decreased in a variable way as the position of the underlayer is far from the axis of the pipe are deposited.

At least two different composite materials may be used for the spooled or wound layers of the type of the first or of the second layer.

According to the present invention, the variable stiffness in bending of the line is provided by the presence of at least one variable stiffness element.

The process may be applied to the manufacturing of a line such as a riser or a riser base.

The line may be connected to a fixed point located at the bottom of a body of water with, the other end of this line being fastened to a surface floating platform such as an offshore platform.

The variable stiffness element consists of at least one layer made up of reinforcing composite underlayers in which the directions of the fibers have an least one component making a zero or a low-value angle with the axis of the line and ending in a graded way.

The reinforcing composite material constituting an underlayer may be carbon.

The underlayers made from carbon fibers may be draped carbon underlayers.

The underlayers made from carbon fibers may be spooled carbon underlayers.

The value of the offset introduced between the various reinforcing composite underlayers is constant or variable.

The variable stiffness element may be applied to a line such as a riser or a riser base.

The line achieved according to the previously described method comprises an end whose shape is adapted to the inner shape of a metallic part assembled to the line.

BRIEF DESCRIPTION OF THE DRAWINGS

Other features and advantages of the present invention will be clear from reading the description hereafter of particular examples illustrated by the accompanying drawings in which:

FIG. 2 shows a variable stiffness element;

FIGS. 3A and 3B show an embodiment of a variable stiffness line;

FIGS. 4A and 4B show a second embodiment of a variable stiffness line;

FIG. 5C diagrammatically shows an example of the device supporting the rings,

FIG. 6 shows an overall diagram of the base of a line assembled to a metallic part and the connection thereof to the ground; and FIG. 7 introduces the above-mentioned magnitudes.

DESCRIPTION OF THE PREFERRED EMBODIMENTS

Figure 1:
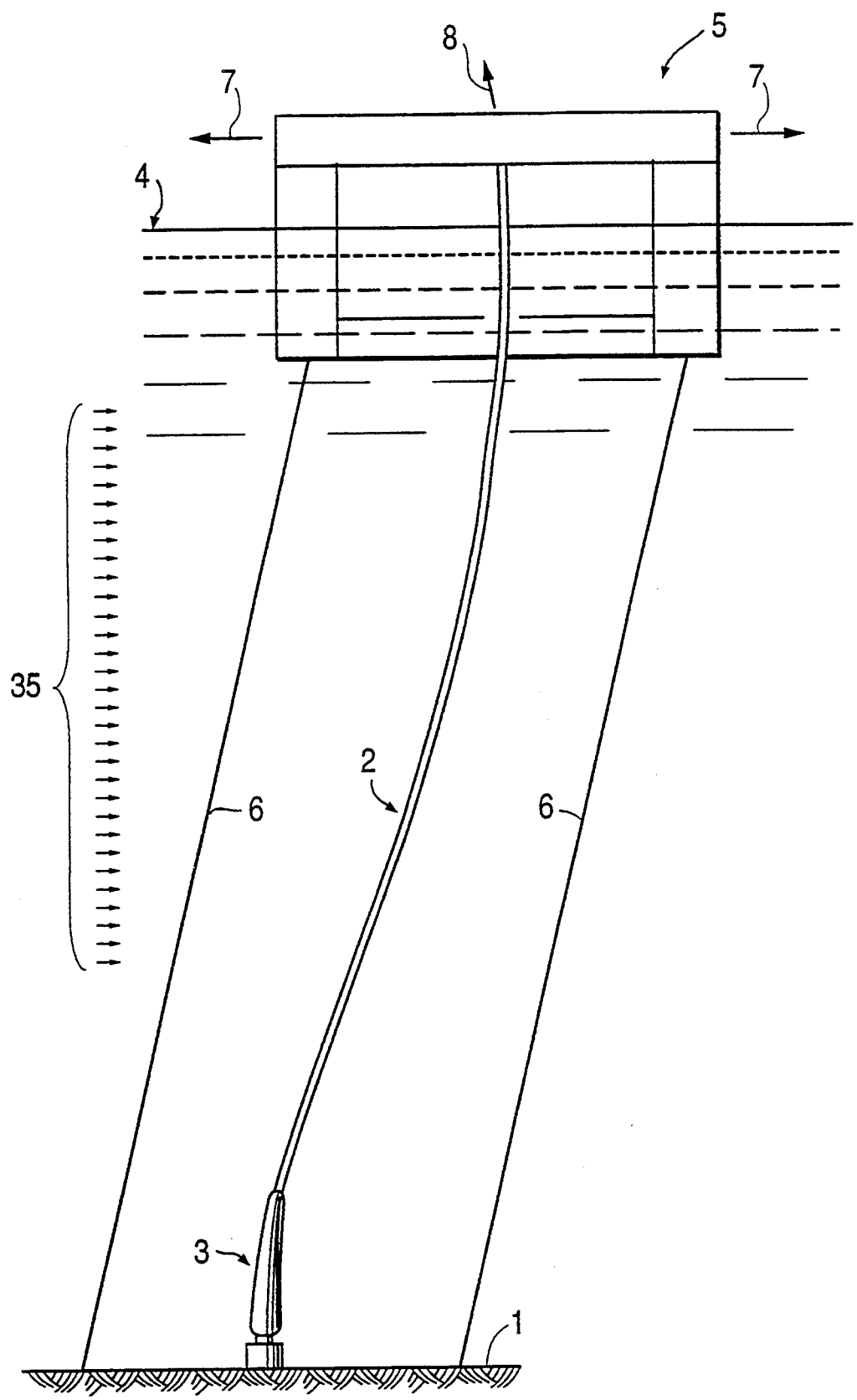
FIG. 1 shows an overall diagram comprising an offshore platform, a line and a joint connecting the line to the sea bottom.

In FIG. 1, numeral 1 refers to the sea bottom which line 2 is to be fixed to by means of connecting element 3 or part of the variable stiffness line according to the present invention.

Numeral 4 corresponds to the water surface on which a platform 5 floats, for example a tension-leg 6 platform. The string is subjected to a tensile stress shown by arrow 8 which may be exerted from platform 5.

This platform and the string undergo displacements shown by arrows 7, notably owing to the wind and currents 35. These displacements impose a deformation of line 2 of the type illustrated in FIG. 1.

In order to prevent these displacements from causing a fast rupture of the base of the line at the place where it is embedded in the ground, the present invention proposes a compact variable stiffness connector 3.

FIG. 2 shows a variable stiffness element Ev consisting of six spooled carbon underlayers C1 ... C6, the offsets d1 ... d5 introduced between the various underlayers being equal. Values d1 ... d5 may have different values or a variable offset without departing from the scope of the present invention.

FIG. 3A shows a way of achieving a line according to the present invention with FIG. 3B being a detailed view showing the way variable stiffness element Ev is integrated during the manufacturing of line 2.

In the present FIG. 3A, the end of line 2 is assembled to a metallic tubular part or connecting tip 31 according to the assembling method described in patent application EN. 91/05,340.

In the example shown in FIG. 3A, the part 11 of line 2 providing the connection to the ground has a substantially constant section over a length 11 of 0.40 m, followed by a part 12 whose thickness variation follows the decrease in the length of the draped carbon underlayers constituting the variable stiffness element which is shown in detail in FIG. 3B over a length of 3 m for example.

Numeral 21 identifies the beginning of the standard length of the line (that is to say outside the variable stiffness zone).

The assembly is cased with a hooped glass layer 20. Numeral 22 shows the inner liner.

This liner may be of the type described in patent FR-2,458,022.

Inner liners may be made of materials well known in the art. Elastomers such as BUNA, HNBR (Hydrogenated Nitrile Buna Rubber) or any other material providing a certain tightness to the line may be used.

Polyamides such as Rilsan may also be used.

The assembly is covered with an outer liner LE providing the tightness of the structure and a protection against shocks.

The length of line 10 (described in detail in FIG. 3B) over which the stiffness of the pipe varies consists of three variable stiffness elements introduced as follows:

A glass fiber layer 13 consists of eight superposed underlayers with each one being made up of a couple of crisscrossed helicoid windings of fibers with the same winding pitch for example, but in the opposite direction in relation to one another. The angle is made by the specific direction of the fiber with the axis of line 2 has a value of alpha, and the underlayers are embedded in a coating material which may be an epoxy resin for example.

A carbon layer 14 consists of three superposed underlayers deposited in the same way as the glass fiber underlayers with an angle beta. The glass 13 and the carbon layers 14 cover the overall length of line 2 with the underlayers embedded in a coating material which may be an epoxy resin.

A variable stiffness element 15 consists of six carbon draped underlayers whose length decreases longitudinally progressively when the position of the underlayer grows further from the axis of line 2.

A glass fiber layer 16 is identical to layer 13; a variable stiffness element Ev 17 is identical to 15 a carbon layer 18 is identical to layer 14.

The assembly is hooped with a circumferential glass fiber layer 20.

The angle alpha preferably ranges between 50 and 75°.

The angle beta preferably ranges between 10 and 25°.

A line whose stiffness varies from 4.7 MNm$^2$ to 11.5 MNm$^2$ over a length of 3 meters for example is obtained by arranging 5 variable stiffness elements consisting each of six draped carbon underlayers.

One possible distribution of the various layers and of the variable stiffness elements is given in Table 1, in which the thickness values correspond to theoretical data.

The length over which the variable stiffness element gradually decreases is for example 0.30 meters.

TABLE 1

| Kind of layer | Deposition technique | Number of underlayers | Thickness of each underlayer | Total thickness of the layer |
|---|---|---|---|---|
| Outer layer glass fibers | hooped | | | |
| glass fibers | spooled $\alpha \simeq 60°$ | 7 | 2.7 mm | 15.4 mm |
| carbon | draped 0/90° | 6 | 2.2 mm | 13.2 mm |
| carbon | spooled $\beta \simeq 19°$ | 3 | 1.68 mm | 5.04 mm |
| carbon | draped 0/90° | 6 | 2.2 mm | 13.2 mm |
| glass fibers | spooled $\alpha \simeq 60°$ | 8 | 3.2 mm | 25.6 mm |
| carbon | draped 0/90° | 6 | 2.2 mm | 13.2 mm |
| carbon | spooled $\beta \simeq 19°$ | 3 | 1.81 mm | 5.43 mm |
| carbon | draped 0/90° | 6 | 2.2 mm | 13.2 mm |
| glass fibers | spooled $\alpha \simeq 60°$ | 8 | 3.2 mm | 25.6 mm |
| carbon | draped 0/90° | 6 | 2.2 mm | 13.6 mm |
| carbon | spooled | 3 | 1.68 mm | 5.04 mm |
| glass fibers | spooled $\alpha \simeq 60°$ | 8 | 3.2 mm | 25.6 mm |

The cohesion or assemblage between the variable stiffness elements and the layers constituting the standard part of the line is for example provided by the matrix which adheres to the fibers and substantially forms a continuous medium at the time of the cross-linking.

Several variable stiffness elements may be arranged on the line during the manufacturing by distributing them over the length of the line without departing from the scope of the present invention.

The number of elements locally integrated on the line during the manufacturing depends on the value of the variable stiffness that is desired for the line.

This example is in no way limitative. The parameters, the number of variable stiffness elements, the number of underlayers constituting a variable stiffness element, the distribution thereof in the manufacturing of the line, length by which the variable stiffness element is gradually decreased may change.

The overall stiffness given to the line depends on the number of spooled layers and the number of elements.

FIG. 4A shows an embodiment of line 2 according to the process described above in which two variable stiffness elements are added around a line 2 so as to give the line a stiffness varying over part of the length thereof.

FIG. 4B shows the way the two elements are added and linked to line 2.

The two variable stiffness elements 23 and 24 are deposited around line 2.

The first element 23 is deposited on line 2, the linking between them being provided for example by a glue film, then it is covered with a spooled glass fiber layer identical to the layers usually constituting the standard part of line 2.

The second element 24 is deposited thereafter around the glass fiber layer 25.

The assembly is hooped with a circumferential glass fiber layer 26 which extends for example over a length of 0.20 m, beyond the length of the assembly constituted by the elements Ev and the glass fiber layers added around line 2.

An outer liner LE may be deposited around and on the overall length of the line.

In the present example, line 2 has a constant section over a length 27 of 0.40 m and a section varying as a function of the number of elements added over a length 28 of 3 m for example. The stiffness variation of the line occurs on part 28.

The number of elements which are added around the line depends on the variable stiffness value that is to be given to the line, the stiffness given to the line depending on the number of elements and on the number of carbon layers and glass layers.

The elements may be distributed in several places on the line without departing from the scope of the present invention.

Another way of proceeding consists in using, for the variable stiffness element, spooled carbon underlayers instead of draped carbon underlayers. Such a technology will be described by referring to FIGS. 3A, 3B, 5A and 5B.

It is described as follows:

1) A first composite layer 13, for example glass fibers, is wound round the inner liner 22, the layer consisting of n superposed underlayers each one made up of a couple of crisscrossed helicoid windings of fibers with the same winding pitch, for example, but in the opposite direction in relation to one another, and the angle made by the specific direction of the fiber with the axis of line 2 has a value alpha, the underlayers being embedded in a coating material which may be an epoxy resin for example.

2) A carbon layer consisting of a number m of superposed underlayers deposited in the same way as the glass fiber layer is wound around the first layer and in the same way with an angle beta. The glass 13 and the carbon layers 14 cover the overall length of line 2, the underlayers are in both cases embedded in a coating material which may be an epoxy resin for example, and the values n and m may be equal.

3) Two rings 51, 52 (FIG. 5A) bearing spikes on the periphery thereof are positioned at each end of a length equal to the length L over which a stiffness variation +1 corresponding to a part of the non usable fibers which will be removed later is to be obtained. One of the two rings is positioned at one end of line 2, for example, that which is the closest to the base located on the right in the figure, and remains stationary during the spooling operation described hereafter. The two rings may be borne by a device such as that described in FIG. 5C. Rings 51 and 52 are respectively integral with holders L1 and L2, which are themselves integral with a frame B on which the holders can slide longitudinally, and which allows a precise positioning of the holders, and therefore of the rings. The deposition of the first underlayer can be achieved for example as follows: after positioning the two rings 51 and 52, the height of spike support SP is adjusted so that it is in contact with the last layer deposited on the pipe. The fibers or fiber plies 15. 1 made from carbon are continuously deposited by displacing the bodkin P which the fiber passes through between the two rings, then by making the bodkin pass round spikes 53, so that the fiber achieves a return around the spikes borne by rings 51, 52. Bodkin P goes to and fro between the two rings (in the figures, the position of the bodkin is shown in full line and in dotted line). To that effect, it is mounted on a carriage and the displacement thereof is controlled by a device which is not shown in FIGS. 5A, 5B and 5C. A longitudinal fiber or a ply of longitudinal fibers thus passes round a spike 53 and, following a circumferential path, reaches another, adjoining spike 53 and passes round it, before turning back longitudinally above the length of the pipe constituting the variable stiffness element. As spike support SP may introduce a given thickness at both ends of the element constituted thereby, the purpose of the circumferential winding EC described hereafter, allowing the fibers to be held in position, is also to press the fibers deposited thereby against the previously deposited layer.

It should be noted that the fibers can pass round a single spike or two directly adjoining spikes, or else two spikes that are not directly next to each other.

In the latter case, the fibers follow a circumferential path above the ring between the two spikes which they pass round. The wires are thus stabilized at the time of the inversion of the direction of deposition of the longitudinal fibers. As stated above, a circumferential winding EC thereafter binds or holds up the longitudinal layers constituting the first underlayer of the variable stiffness element. Winding is achieved at each end of the length on which the fibers have been spooled on the part of the fibers close to the rings and located between the two rings. The protuberances due to the returns on spikes 53 are thereafter removed by achieving for example a laser beam cutting which allows precise elimination of the protuberance. The protuberance located on the ring which remains stationary may possibly be left and removed at the end of the manufacturing of the pipe.

At least one of the two rings is thereafter offset, preferably that which is positioned at the end opposite the end of the line which fits into a tip or towards the base, by a pitch whose value is equal to the offset that is wanted between the various underlayers forming the variable element.

The pitch may have a variable or constant value. The spooling operation is then repeated so as to constitute the second underlayer 15.2 of the variable stiffness element on which ring 53 has been displaced after adjusting the height of spike support SP.

Figure 5A:
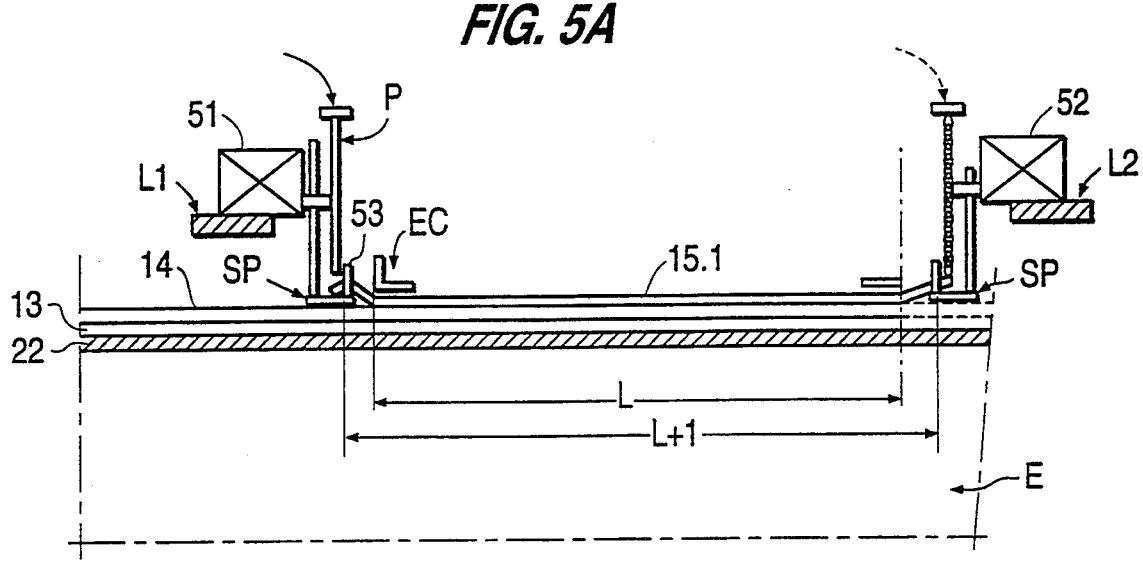
FIGS. 5A and 5B respectively show a schematic cross-section of an embodiment of the first underlayer of a variable stiffness element integrated during the manufacturing and of the end of the construction of this element.
Figure 5B:
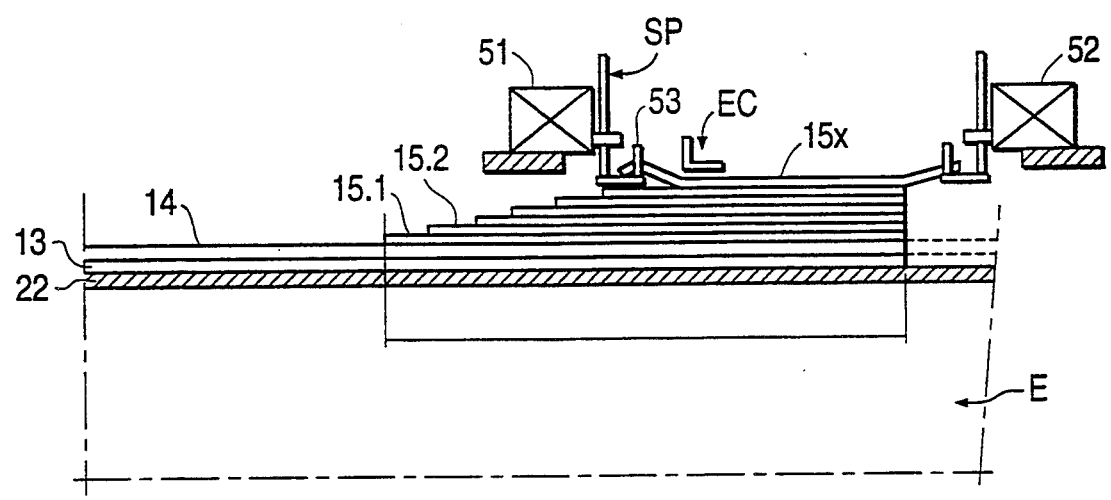

The spooling, binding, protuberance removal and ring offset operations are repeated as often as desired so as to obtain the number of underlayers providing the variable stiffness element with the desired stiffness. At the end of the manufacturing of the variable element, a number x of underlayers is obtained, and the ring position is that which is shown in FIG. 5B.

The binding operation allowing the fibers to be held in position may possibly be replaced by a hooping operation.

A glass fiber layer 16 identical to layer 13 is for example deposited thereafter (FIG. 3B), then the fibers are spooled again so as to constitute a variable stiffness element with a length preferably shorter than the length of the first element integrated during the manufacturing of the line, then a carbon layer 18 identical to layer 14 is deposited, . . . until the stated pipe structure is obtained.

The assembly is then hooped with a circumferential glass fiber layer 20.

The whole assembly is surrounded with an outer liner LE whose purpose is to secure the sea-water tightness of the assembly and thus to avoid any risk of deterioration of inner liner 22 in case of a drop in pressure in the inner ring.

It may be envisaged to spool the fibers or fiber plies constituting an underlayer of the variable stiffness element by means of needles or hooks distributed on the periphery of two rings located at each end of a length corresponding to an underlayer of the variable stiffness element.

The angle alpha preferably ranges between 50 and 75°.

The angle beta preferably ranges between 10 and 25°.

The selection of the angle alpha and beta values to provide the pressure and traction stability of the line.

The winding angle selected for the spooled underlayers constituting the variable stiffness element ranges for example between 0 and 20°, preferably between 0 and 3°.

The data included in Table 1 are applicable to the new way of proceeding using for the variable stiffness element spooled carbon underlayers. All the data relating to the draped technique, with an angle of 0/90°, must thus be replaced in the table by a spooled technique, with an angle ranging between 0 and 20°, preferably between 0 and 3°.

Another way of proceeding consists of achieving the variable stiffness element apart from the process of manufacturing of the line around a spindle for example, and then to add one or several of these elements around a line 2 so as to give the line a stiffness varying over at least part of the length thereof.

A technique of deposition and of integration of the variable stiffness element around the line identical to that described in relation to the example of FIGS. 4A, 4B is used. The only difference is due to the fact that the variable stiffness element consists in this case of spooled carbon underlayers.

The illustrative example given for FIGS. 4A and 4B is applicable for the adding of the spooled layer elements.

The number of elements which are added around the line depends on the value of the variable stiffness that is wanted for the line.

The value of the line stiffness depends on the number of added elements and on the number of carbon and glass layers.

The elements may be distributed in several places on the line without departing from the scope of the present invention.

Similarly, it may be envisaged to displace the two rings so as to have a variation in the length of the variable stiffness elements at each end thereof.

FIG. 6 shows the way the connection of variable stiffness line 2 with the bottom is achieved.

In the embodiment shown in this figure, line 2 has a part 30 of variable stiffness.

The end of line 2 receives a metallic tubular part or connecting tip 31 described in patent EN.91/05,340.

In the example shown in FIG. 6, the end of line 2 has a constant section over part of the length thereof so as to assemble it to connecting tip 31 (see detail in FIG. 3A).

This example is in no way limitative, any other shape may be envisaged for the connecting tip and the shape of the end of line 2 can be adapted accordingly.

The tip comprises among other things two inserts inside which the line is interposed, which is not shown in the figure.

The inserts are fitted with radial bores which receive pins 32 crossing radially the wall of line 2 whose ends occupy said opposite bores.

Connecting line 2 to the bottomhole installation is achieved through a connector 33 which provides he continuity with the bottomhole installation. The tensile stresses are directly transmitted through line 2 to base 34 by means of connector 33.

Of course, various modifications or addings may be provided by the man skilled in the art to the process and to the element whose description has been given above by way of illustration, which is in no way limitative, without departing from the scope of the invention.

We claim:

1. A process for achieving a line having a stiffness varying over at least part of a length of the line with the line having at least one variable stiffness element having composite and fiber underlayers comprising:

winding a first underlayer of fiber composite in a helicord wound with a winding angle measured with respect to an axis of the line;

winding a second underlayer of fiber composite in a helicoid in contact wound with the first underlayer of fiber composite with a winding angle measured with respect to the axis of the line with the winding angles of the fiber composites of the first and second underlayers being different;

positioning a plurality of composite underlayers including a fiber over the second underlayer with longitudinal dimensions of each composite underlayer ending in a graded way;

winding at least one additional underlayer over the plurality of composite underlayers with the at least one additional underlayer being of a type of either the first or second underlayer; and cross linking at least some of the underlayers.

2. A process in accordance with claim 1 wherein:

the composite underlayers are positioned by one of a draping or spooling process.

3. A process as in claim 1 wherein:

each underlayer is positioned such that a longitudinal dimension measured along the line decreases with increasing radius measured from an axis of the pipe.

4. A process as in claim 1 wherein:

at least one variable stiffness element surrounds the line and is linked thereto.

5. A process as in claim 1 further comprising:

integrating the variable stiffness element to the line during the process of manufacturing the line.

6. A process as in claim 2 further comprising:

providing an initial pipe as an inner liner which provides tightness of the pipe.

7. A process as in claim 2 further comprising:

depositing an outer liner after cross linking the underlayers.

8. A process as in claim 2 wherein the positioning of the plurality of composite underlayer comprises the following steps:

(a) positioning two rings respectively located at each end of a length defining an underlayer forming a variable stiffness element, said ring bearing spikes distributed on the periphery thereof;

(b) spooling fibers or fiber plies by turning the fibers or fiber piles around on the spikes;

(c) binding each end of the fibers or fiber plies by a circumferential winding so that a protuberances due to return on the spikes are located outside a part of constant thickness of the underlayer located between the two rings;

(d) removing the protuberances due to a return of the spikes;

(e) displacing at least one of the two rings by a pitch equal to an offset that is wanted between the underlayers form the variable thickness element; and repeating steps (a)-(e) until a number of underlayers corresponding to the variable stiffness that is wanted for the variable stiffness element is obtained.

9. A process as in claim 2 wherein the positioning of the plurality of underlayers comprises:

(a) positioned two rings respectively at each end of a length defining an underlayer constituting a variable stiffness element, said ring bearing spikes distributed on the periphery thereof;

(b) spooling fibers or fiber piles forming an underlayer by turning the fibers or fiber plies around on the spikes;

(c) a cross linking an assembly made by the preceding steps (a)-(b);

(d) removing protuberances caused by a return of the spikes;

(e) displacing at least one of the two rings by a pitch equal to the offset that is wanted between the underlayers constituting the variable stiffness element; and (f) steps (a)-(e) are repeated until a number of underlayers corresponding to the variable stiffness desired for the variable stiffness element is obtained.

10. A process as in any one of claims 8 or 9 wherein:
the fibers or fiber plies constituting an underlayer of the variable stiffness element are spooled by means of one of needles or hooks distributed on a periphery of two rings located at each end of a length corresponding to an underlayer constituting the variable stiffness element.

11. A process as in any one of claims 8 or 9 wherein:
a fiber or ply of longitudinal fibers is turned back around on two spikes having a circumferential path between two spikes the fiber or ply of fibers passes around.

12. A process as in claim 1 further comprising:
selecting the angles to provide pressure and traction stability of the line.

13. A process as in claim 1 further comprising:
choosing the composite underlayers to be carbon fibers.

14. A process as in claim 2 further comprising:
choosing the composite underlayers to be fibers.

15. A process as in claim 2 wherein:
the positioning of the plurality of composite underlayers and winding the at least one additional underlayer is repeated to obtain a desired variable stiffness value of the stated line.

16. A process as in claim 1 further comprising:
decreasing longitudinal dimensions of the composite underlayers in a constant graded way.

17. A process as in claim 1 further comprising:
decreasing the longitudinal dimensions of the composite underlayers in a variable way.

18. A process as in claim 1 further comprising:
using at least two composite materials in the first or the second underlayer.

19. A variable stiffness element having composite and fiber underlayers comprising:
a first underlayer of fiber composite formed in a helicord with the first underlayer forming a winding angle measured with respect to an axis of the line;
a second underlayer of fiber composite formed in a helicord over the second underlayer of fiber composite having a winding angle measured with respect to the axis of the line with the winding angles of the fiber composites of the first and second underlayers being different;
a plurality of composite layers containing fiber positioned over the second underlayer with longitudinal dimensions of each composite underlayer ending in a graded way;
at least one additional underlayer positioned over the plurality of composite underlayers being of a type of either the first or second underlayer; and wherein
at least one of the underlayers is cross linked.

20. An element in accordance with claim 19 wherein:
the plurality of composite underlayers comprise carbon.

21. An element in accordance with claim 19 wherein:
the plurality of composite underlayers comprise draped carbon layers.

22. An element in accordance with claim 19 wherein:
the plurality of composite underlayers comprise spooled carbon fiber.

23. An element in accordance with claim 19 wherein:
the longitudinal dimensions ending in a graded way vary in length between each underlayer with a constant variation in length.

24. An element in accordance with claim 19 wherein:
the longitudinal dimensions ending in a graded way vary in length between each underlayer with a variable variation in length.

25. An element in accordance with any one of claims 19-24 wherein:
the element is part of a riser or riser base.

* * * * *